May 14, 1929.  G. W. STALLINGS  1,712,720
TRUNK
Filed Oct. 13, 1926  2 Sheets-Sheet 1
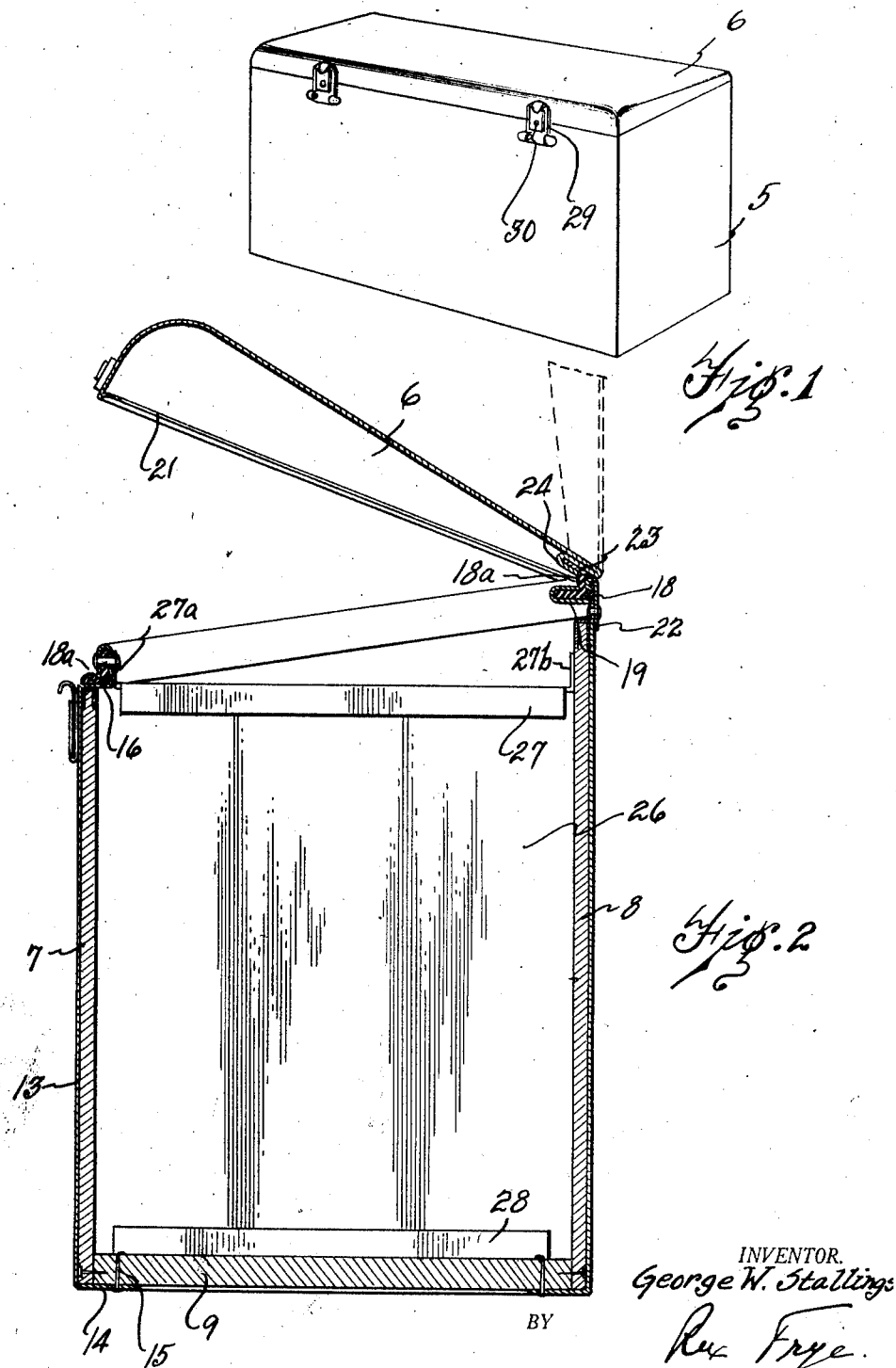

May 14, 1929.  G. W. STALLINGS  1,712,720
TRUNK
Filed Oct. 13, 1926   2 Sheets-Sheet 2
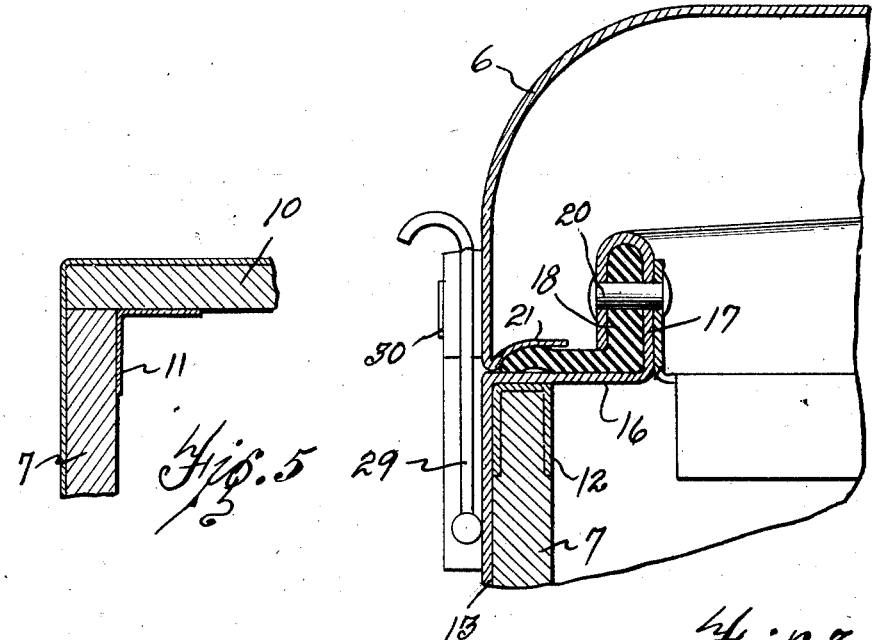
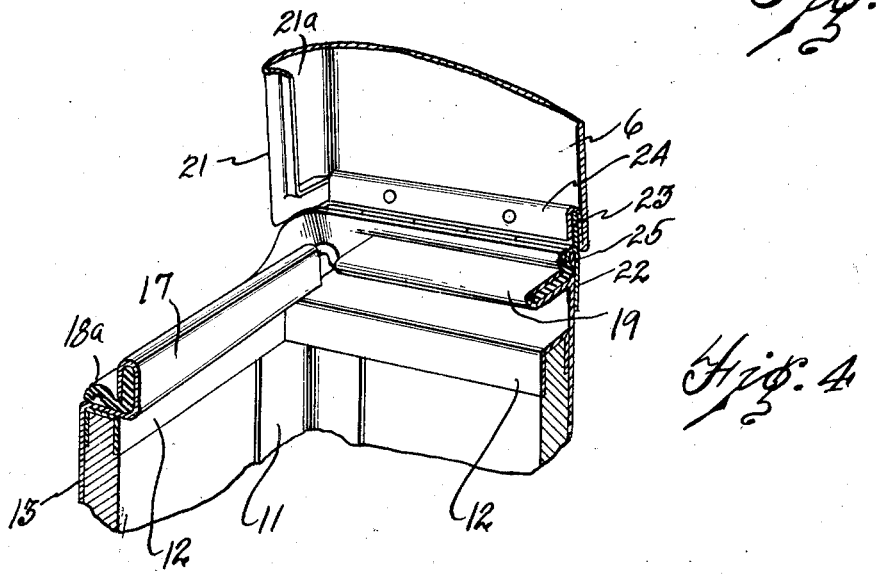
INVENTOR.
George W. Stallings
BY
Rex Frye
ATTORNEY.

Patented May 14, 1929.

1,712,720

UNITED STATES PATENT OFFICE.

GEORGE W. STALLINGS, OF JACKSON, MICHIGAN, ASSIGNOR TO WATTS-MOREHOUSE COMPANY, OF JACKSON, MICHIGAN.

TRUNK.

Application filed October 13, 1926. Serial No. 141,275.

This invention relates to trunks and other receptacles, and is especially adapted for trunks to be carried at the rear of automobiles and like vehicles.

One of the objects of my invention is the provision of a trunk or like receptacle having improved means for sealing the trunk against the ingress of moisture, dust and other deleterious elements.

Another object of my invention is the provision of an improved mounting of the trunk cover upon the body portion, whereby the cover when fully opened will be substantially in line with the rear wall of the trunk body, enabling the securing of the trunk with its rear wall in close proximity to the body of an automobile and the like.

A further object of my invention is the arrangement of a novel rubber sealing strip around the entire upper portion of the body of the trunk, with co-acting novel construction of the trunk cover for completely sealing the corners of the trunk as well as the front, rear and side walls thereof.

Other objects and advantages will be apparent from the following description, wherein reference is made to the accompanying drawings illustrating a preferred embodiment of my invention and wherein similar reference numerals designate similar parts throughout the several views.

In the drawings:

Fig. 1 is a perspective view of my improved trunk with the cover closed.

Fig. 2 is an enlarged vertical cross section through the trunk with the cover shown in full lines in partially opened position and in dotted lines in its fully opened position.

Fig. 3 is an enlarged detail sectional view showing the manner of mounting the rubber sealing strip upon the trunk body and the formation of the co-acting portions of the trunk cover.

Fig. 4 is a detail perspective view showing the arrangement of the rubber sealing strip and trunk cover adjacent one of the rear corners of the trunk, and Fig. 5 is a detail sectional view showng the manner of mounting the trunk lining at the corners of the trunk.

Referring now to the drawings, the numeral 5 designates a trunk body and 6 the cover thereof, the cover and body being hingedly connected at their rear wall in a novel manner, as hereinafter pointed out.

Both the cover and body of the trunk are preferably formed of sheet metal of suitable thickness, and in the illustrated embodiment I have shown a lining and floor of the trunk that may be formed of wood, fiber or other suitable material. As best illustrated in Figs. 2 and 4 the lining members 7 and 8 for the front and rear walls extend the full length of the trunk and are nailed or otherwise suitably secured to the floor board 9, the lining members 10 for the sides of the trunk being then abutted against the side edges of the lining strips 7 and 8 and floor board 9, and suitably secured thereto. Corner channels 11 may then be arranged to brace the lining members, substantially as shown in Fig. 5, and preferably the upper edges of the several lining members are protected by U-shaped channel members 12. The lining members 7, 8 and 10 thus form an inner frame or box, which is then sheathed by the metallic cover plate 13 to give strength and rigidity to the trunk body. The lower extremities of the metallic sheath 13 are inbent to form lower flanges 14 completely covering the lower edges of the lining members 7, 8 and 10 and extending into engagement with the bottom of the floor board 9, to which the flanges 14 may be secured by clinched nails 15 or the like. The front and side walls of the sheath member 13 are flanged adjacent their upper extremities to accomplish several objects, to-wit, increase the rigidity of the trunk body, protect the upper extremities of the lining members 7 and 10, provide means for securing a sealing strip to prevent the ingress of moisture, dust, etc. when the trunk is closed, and furnish a shelf upon which the sealing member can be compressed by the weight of the cover 6 to aid in excluding deleterious elements from the closed trunk. As best shown in Figs. 2 and 3 the sheath 13 is inbent to form a shoulder or shelf 16, the undersurface of which engages the channel strips 12 on the lining members 7 and 10 to reinforce such lining members. At the inner extremities of the shelf 16, the sheath 13 is bent upwardly to form vertical walls 17 spaced suitable distances from the front and side walls of the sheath 13, and at the upper extremity of the walls 17 the metal of the sheath is curved outwardly and then downwardly, substantially as shown in Fig 3, to provide an inverted substantially U-shaped channel for the reception of one arm of a substantially rectangular sealing strip 18, the other arm of the strip being adapted to rest upon the upper surface of the shelf 16. The metallic sheath for the rear wall of the trunk is formed at its upper extremity with a rearwardly opening channel 19 (note Figs. 2 and 4) for the reception of the fixed arm of the sealing strip 18, the metal of the sheath being preferably bent inwardly and then curved upwardly and outwardly to form the channel.

The sealing strip 18 is preferably formed of rubber or other resilient material with its fixed arm of appropriate thickness to give the desired strength. The free arm of the strip 18 may be of lesser thickness than its fixed arm and is normally shaped substantially as shown in Figs. 2 and 4 with a hollow bead 18ª extending longitudinally of the strip and substantially parallel with the fixed arm. When the fixed arm of the sealing strip 18 is properly secured within the inverted channel at the upper extremity of the sheath 13, as by rivets 20 or the like, the lower face of the free arm of the strip will rest upon the shelf 16 with the hollow bead 18ª extending upwardly above the shelf, thus providing a resilient sealing member in position to be compressed against the shelf 16 by the weight of the cover 6 when swung to closed position. To enable substantially complete sealing of the front and sides of the trunk the cover 6 is formed with an inbent flange 21 at its front and sides for engagement with the free arm of the sealing strip 18. Preferably the flange 21 is shaped substantially as shown in Fig. 3, being first bent to incline upwardly and inwardly from the outer edge of the trunk cover and then extending inwardly at substantially right angles to the front and side walls of the trunk cover. By virtue of this arrangement when the trunk cover is being closed the flange 21 will first engage the upper extremity of the hollow bead 18ª of the sealing strip, and further movement of the trunk cover will tend to flatten out the hollow bead and compress the free arm of the sealing strip against the upper surface of the shelf 16 of the trunk body. This results in deforming the free arm of the resilient sealing strip 18 so that it substantially fills all space between the flange 21 of the trunk cover and shelf 16 of the trunk body, thereby effectively excluding moisture, dust, etc.

It has hitherto been practically impossible to seal the hinged area of a trunk against the ingress of moisture and dust without having rearwardly extending members that overhang the rear wall of the trunk for a comparatively great distance, thus making it impossible to position the trunk in close proximity to an automobile body or the like. I have devised a construction whereby the cover 6 may be hinged upon the rear wall of the trunk body without overhanging flanges while the hinged area is effectively sealed against moisture, dust, etc. As best shown in Figs. 2 and 4, one hinge member 22 is riveted or otherwise secured to the metallic sheath of the rear wall of the trunk body with its pintle receiving portion fitting into the hollow bead 18ª of the sealing strip 18 secured in the channel 19 of the trunk body. The other hinge member 23 is secured in an outwardly opening channel 24 preferably formed integral with the trunk cover by first bending the trunk cover inwardly and then curving it downwardly and outwardly substantially as shown. The hinge member 23 can then be readily inserted within the channel 24 and suitably secured therein, as by welding. The pintle receiving portions of the hinge member 23 interfit and align with the pintle receiving portions of the hinge member 22, and also snugly engage the hollow bead 18ª of the sealing strip 18. A pintle 25 is then inserted into the aligned pintle receiving portions of the hinge members 22 and 23. The sealing member 18 at the rear of the trunk body is arranged with its fixed arm in the channel 19 and its free arm extending upwardly and partially around the pintle receiving portions of the hinge members. When the trunk cover is in open position, as shown in Fig. 4, there is no contact between the trunk cover and the free arm of the sealing strip 18. When, however, the cover is swung toward closed position the channel 24 of the trunk cover swings into engagement with the free arm of the sealing strip and compresses it against the pintle receiving portions of the hinge member.

To effectively seal the rear corners of the trunk body against ingress of moisture, dust, etc., I have provided flange portions 21ª on the trunk cover extending substantially perpendicularly from the channel 24 of the trunk cover and at an angle to the shoulder 21 of the sides of the trunk cover. This shoulder portion 21ª will, accordingly, swing during the closing of the trunk cover from the position shown in Fig. 4 to a substantially vertical downwardly extending position when the trunk cover is completely closed. For cooperation with the shoulder members 21ª on the trunk cover I arrange the free arm of the sealing strip so that it may be compressed by the shoulder portions 21ª against the sides of the channels 17 of the trunk body at the rear corners of the trunk. To accomplish this I swing the fixed arm of the sealing member 18 from its substantially vertical position at the sides of the trunk to a substantially horizontal position at the rear wall of the trunk. This turning of the sealing member changes the position of the free arm from below the fixed arm at the sides of the trunk to above the fixed arm at the rear of the trunk and so presents a curved substantially fan shaped portion of the free arm of the sealing strip at each rear corner of the trunk in position to be engaged by the shoulder portions 21ª on the trunk and be compressed thereby during the closing of the trunk cover.

If desired, partition walls 26 may be arranged within the trunk body to divide it into compartments. In Fig. 2 I have shown a partition wall 26 extending between the front and rear lining walls 7 and 8 and with its upper and lower edges protected by oppositely directed channel members 27 and 28 respectively. The upper channel member may have upwardly extending tabs 27ª and 27ᵇ for securing the partition wall to the metallic sheath 13 and rear lining member 8 and so positioning the partition wall.

After the trunk cover has been swung toward closing position, it may be further drawn downwardly to aid in sealing the mouth of the trunk by means of cam or lever latches 29, which may also be equipped with key actuated locks 30 if desired, after the usual manner of trunk fasteners.

The simplicity and practicability of my improved trunk is believed to be apparent. The body member is practically of metal reinforced by the lining members, while the interior of the trunk protects garments, etc. from contact with the metal portions of the trunk. The shoulder 16 and sealing strip securing portions of the trunk body aid in stiffening the metallic sheath and positioning the sealing strip so as to completely seal all the walls of the trunk as well as the corners which have been most difficult to seal in the trunks heretofore made. The trunk cover is stiffened by the inturned shoulder 21 at its front and sides as well as by the channel 24 adjacent its rear edge. Moreover, the mounting of the cover enables the cover when fully opened to be in substantially vertical alignment with the rear wall of the trunk body, thus enabling the placing of the trunk in close proximity with room walls or an automobile body. Again, ingress of moisture and dust is prevented at the hinged connection between the trunk cover and body.

While it will be apparent that the illustrated embodiment of my invention herein disclosed is well calculated to adequately fulfill the objects and advantages primarily stated, it is to be understood that the invention is susceptible to variation, modification and change within the spirit and scope of the subjoined claims.

Having described my invention, I claim—

1. In a trunk, means for sealing the mouth of the trunk including a resilient sealing strip extending entirely around the mouth of the trunk body in position to be compressed by adjacent portions of the front, rear and side walls of the trunk cover when the cover is moved to closed position, said sealing strip being formed with an arm fixed to the trunk body and a free arm arranged to be engaged by the trunk cover, the free arm being positioned below the fixed arm of the sealing member at the front and sides of the trunk body and above the fixed arm at the rear of the trunk body.

2. In a trunk, means for sealing the mouth of the trunk including a resilient sealing strip extending entirely around the mouth of the trunk body in position to be compressed by adjacent portions of the front, rear and side walls of the trunk cover when the cover is moved to closed position, and means for securing the sealing strip upon the trunk body including a shelf upon which the sealing strip rests and a channel member arranged inwardly of the shelf and adapted to receive a portion of the sealing strip.

3. In a trunk, means for sealing the mouth of the trunk including a resilient sealing strip extending entirely around the mouth of the trunk body in position to be compressed by adjacent portions of the front, rear and side walls of the trunk cover when the cover is moved to closed position, said sealing strip being formed with a pair of angularly disposed arms, and means for securing the sealing strip upon the trunk body including a shelf upon which one arm of the sealing strip is adapted to normally rest, and a channel portion arranged inwardly of the shelf and enclosing the other arm of the sealing strip.

4. In a trunk, a trunk body having a shelf at the upper extremities of its front and side walls, a resilient sealing strip having a pair of angularly disposed arms, means for securing one of the arms of the sealing strip to the trunk body with the other arm thereof resting upon said shelf, and a trunk cover having a shoulder portion arranged inwardly of and above the lower edges of the front and side portions of the trunk cover when the cover is in closed position, said shoulder portion being adapted to compress the free arm of the sealing strip against said shelf while the cover is being closed.

5. In a trunk, a trunk body having a shelf at the upper extremities of its front and side walls, a resilient sealing strip having a pair of angularly disposed arms, one of which is adapted to be secured to the trunk body and the other of which is formed with a hollow bead adapted to rest upon said shelf, and a trunk cover having a shoulder portion on its front and sides adapted to engage the beaded portion of the resilient strip while the cover is being closed.

6. In a trunk, a trunk body having a substantially vertically disposed channeled portion at the upper extremities of its front and sides and a substantially horizontally disposed channeled portion at the upper extremity of its rear wall, a resilient sealing strip having a pair of angularly disposed arms, one of which is adapted to be secured in said channeled portions of the trunk, and a trunk cover arranged to compress the sealing strip upon the trunk body while the cover is being closed.

7. In a trunk, a trunk body having a substantially vertically disposed channeled portion at the upper extremities of its front and sides and a substantially horizontally disposed channeled portion at the upper extremity of its rear wall, a resilient sealing strip having a pair of angularly disposed arms, one of which is adapted to be secured in said channeled portions of the trunk, and a trunk cover hingedly connected to the rear wall of the trunk body and having inbent portions adapted to compress the sealing strip upon the trunk body while the cover is being closed.

8. In a trunk, a trunk body having a substantially vertically disposed channeled portion at the upper extremities of its front and sides and a substantially horizontally disposed channeled portion at the upper extremity of its rear wall, a resilient sealing strip having a pair of angularly disposed arms, one of which is adapted to be secured in said channeled portions of the trunk, the other arm of the sealing strip being arranged below the channeled portions at the front and sides of the trunk body and above the channeled portion at the rear of the trunk body, whereby substantially fan shaped portions of the free arm of the sealing strip are provided at the rear corners of the trunk, and a trunk cover hingedly connected to the rear wall of the trunk body and arranged to engage the free arm of the sealing strip while the cover is being closed.

9. In a trunk, a trunk body having a substantially vertically disposed channeled portion at the upper extremities of its front and sides and a substantially horizontally disposed channeled portion at the upper extremity of its rear wall, a resilient sealing strip having a pair of angulary disposed arms, one of which is adapted to be secured in said channeled portions of the trunk, the other arm of the sealing strip being arranged below the channeled portions at the front and sides of the trunk body and above the channeled portion at the rear of the trunk body, whereby substantially fan shaped portions of the free arm of the sealing strip are provided at the rear corners of the trunk, and a trunk cover hingedly connected to the rear wall of the trunk body and having inbent portions adapted to engage the free arm of the sealing strip at all four walls of the trunk body while the cover is being closed.

In witness whereof I hereunto set my hand.

GEORGE W. STALLINGS.